Oct. 14, 1952     J. B. HAND     2,613,468
FISHING REEL
Filed Nov. 8, 1949     4 Sheets-Sheet 1
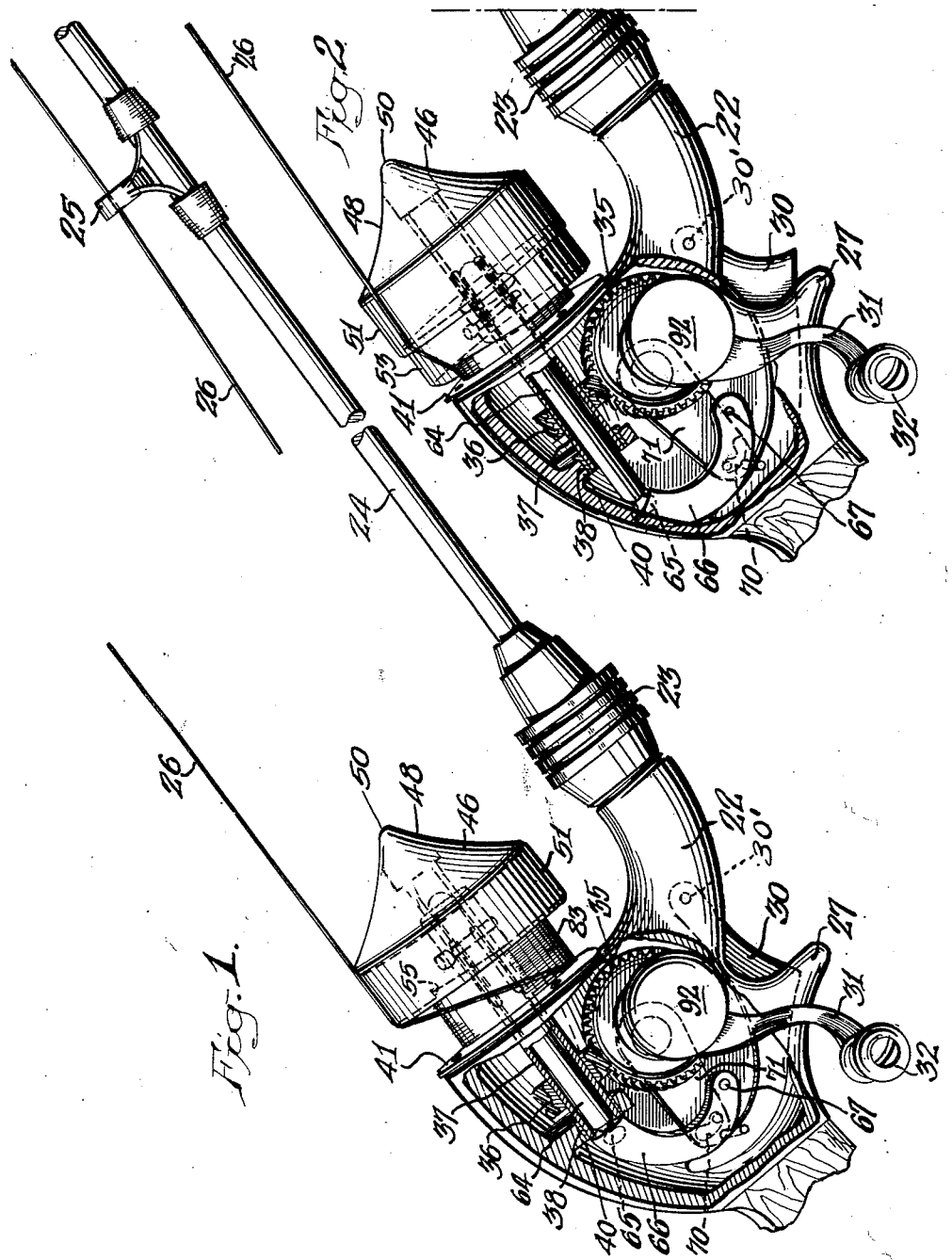
Inventor:
John B Hand
by Attorneys Oct. 14, 1952     J. B. HAND     2,613,468
FISHING REEL
Filed Nov. 8, 1949     4 Sheets-Sheet 2
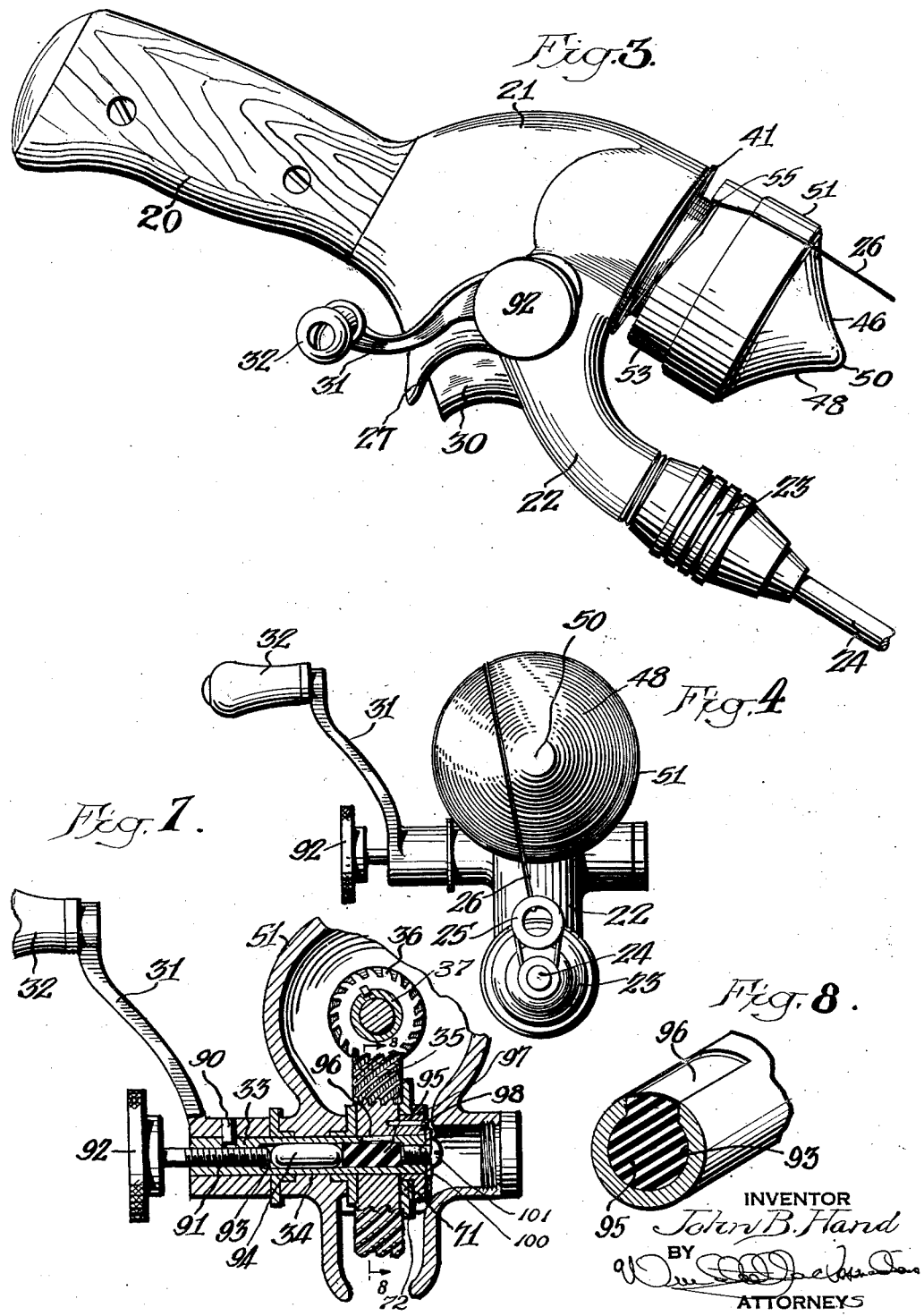

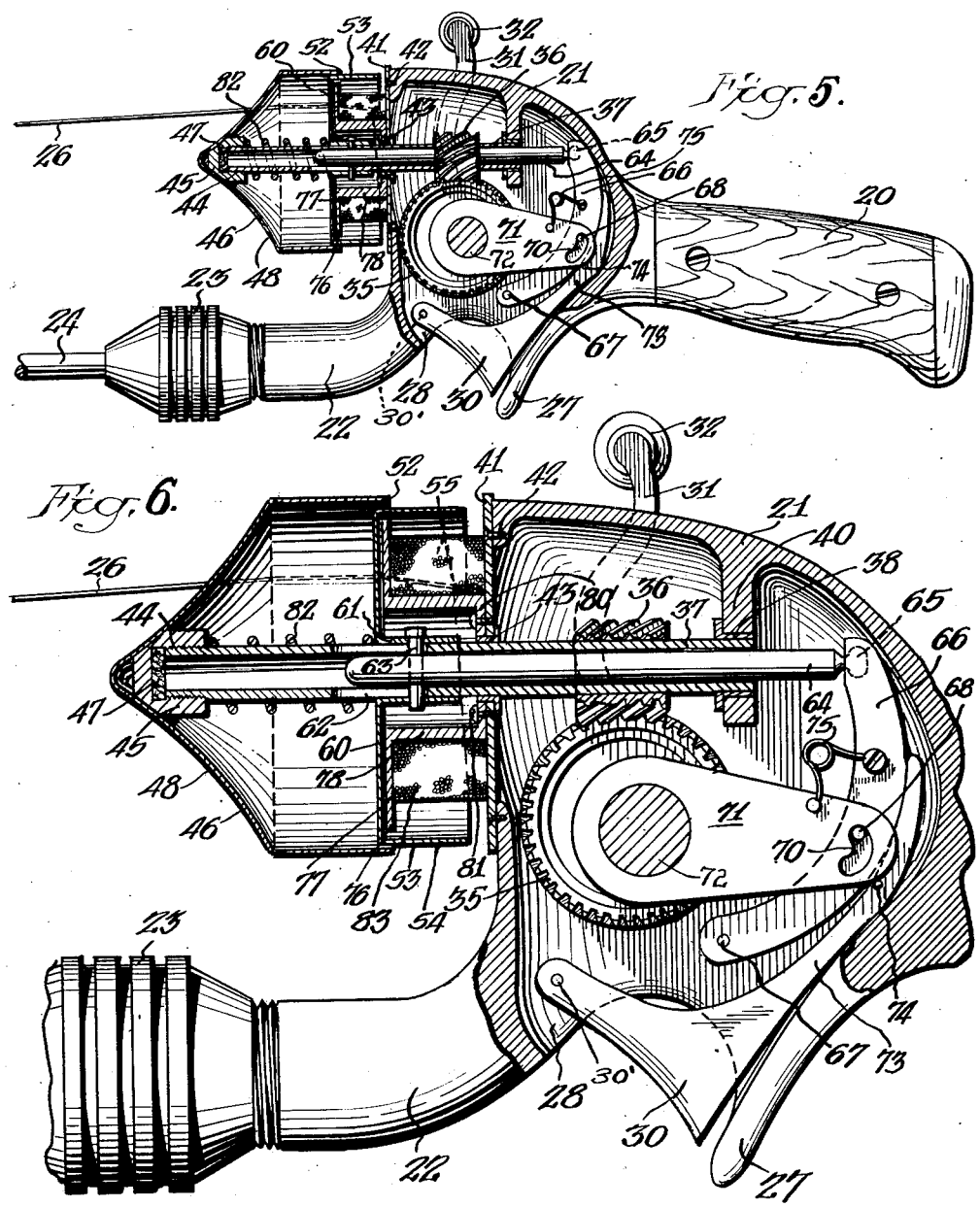

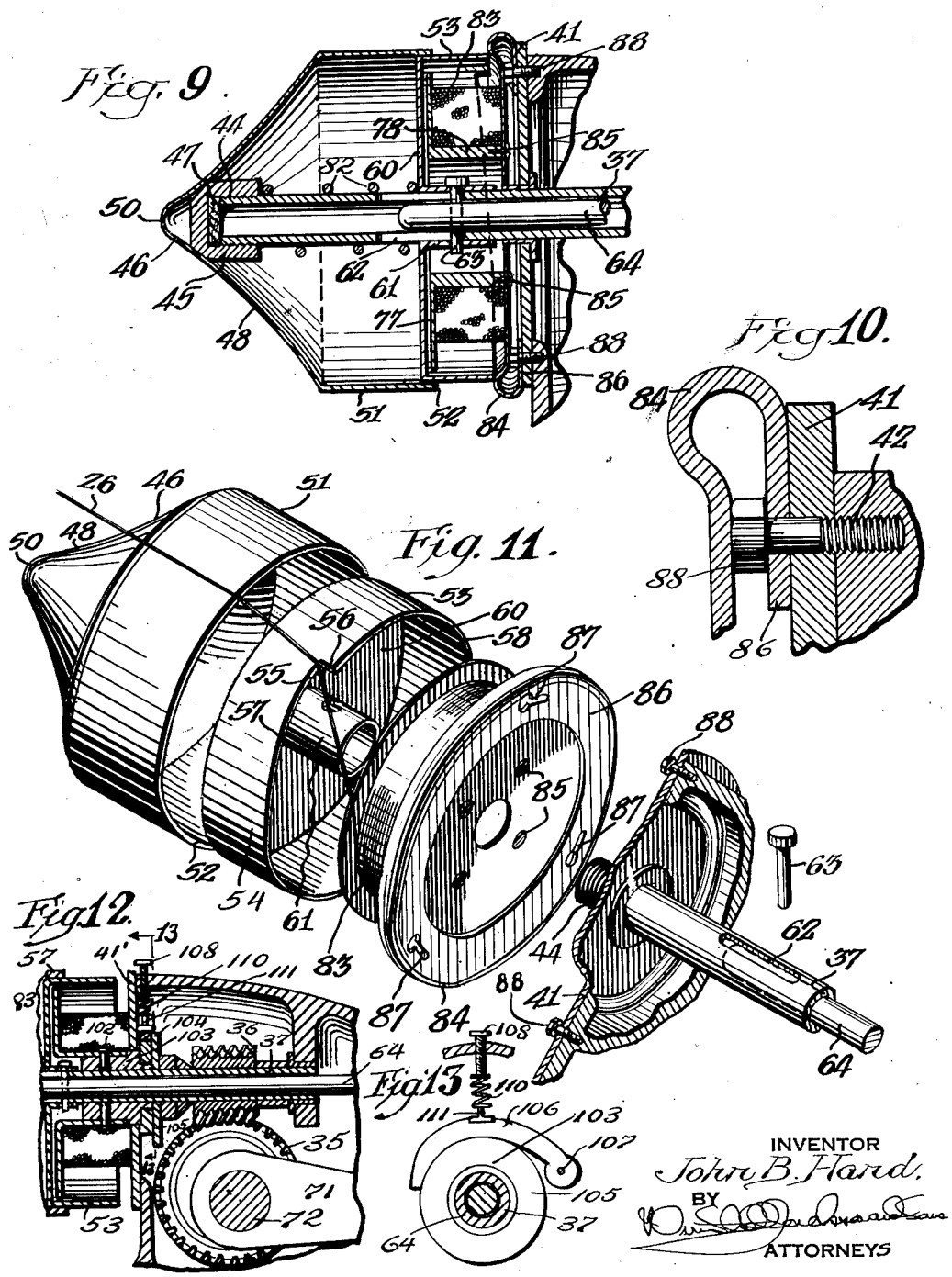

Patented Oct. 14, 1952

2,613,468

UNITED STATES PATENT OFFICE 2,613,468

FISHING REEL

John B. Hand, Haddonfield, N. J.

Application November 8, 1949, Serial No. 126,120

10 Claims. (Cl. 43—20)

The present invention relates to fishing rods and especially to reels therefor.

A purpose of the invention is to simplify the manipulation of a reel by a fisherman, permitting operation by one hand during various phases of reel action, particularly in casting.

A further purpose is to reduce the bulk, weight and complexity of a reel for a fishing rod.

A further purpose is to trigger release the reel and to restore the reel to the adjustment for windup automatically when a cast has been completed.

A further purpose is to pay off by a rotatable head bucket having a smooth pay-off edge on the side of the reel directed toward pay-off and suitably axially beyond the spool.

A further purpose is to wind, hold and release by a pickup which in one position annularly surrounds the spool and in another position telescopes with respect to the bucket and uncovers the spool, the pickup having a suitable slot or other pickup means on the edge adjoining the spool.

A further purpose is to mount the pickup on the bucket shaft and move the pickup axially with respect to the bucket shaft, preferably by a plunger extending through a hollow interior of the bucket shaft.

A further purpose is to uncover the spool by the pickup in response to the action of a trigger on the support adjoining a grip.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figures 1, 2 and 3 are fragmentary perspective views of the rod and reel sectioned in Figures 1 and 2 transversely to the shaft on which the winding crank is mounted and in elevation in Figure 3, illustrating the position of the parts for the various steps of reel operation.

Figure 4 is a front elevation of the pole and reel of the invention.

Figure 5 is a fragmentary elevation of the pole and reel sectioned centrally of the bucket shaft and looking toward the windup crank.

Figure 6 is a fragmentary enlargement of Figure 5.

Figure 7 is a fragmentary section through the windup shaft showing one form of drag.

Figure 8 is an enlarged sectional perspective of the windup shaft of Figure 7, the section being taken on the line 8—8.

Figures 9 to 11 illustrate a variation.

Figure 9 is a section through the windup shaft corresponding to a fragment of Figure 6.

Figure 10 is an enlargement of a portion of Figure 9.

Figure 11 is an exploded fragmentary perspective of Figure 9.

Figure 12 is a view corresponding to a fragment of Figure 6 showing a further variation.

Figure 13 is a section on the line 13—13 of Figure 12.

In the drawings like numerals refer to like parts throughout.

Describing in illustration but not in limitation and referring to the drawings.

Many fishing reels in the prior art have been bulky, cumbersome, heavy and difficult to operate, especially when the user desires to cast while holding on or otherwise employing the other hand. By the present invention the bulk and weight of a fishing reel is greatly reduced and the convenience, accuracy and reliability for casting and other purposes is increased. The user can cast using one hand and can release the rig at the split second desired in casting, thus obtaining more reliable results. The reel automatically returns to the position for windup as soon as the cast is completed.

Drag is readily adjusted to suit the requirements of the particular situation. The fisherman can quickly and easily change line without rewinding.

As the spool is normally stationary, the structure is readily balanced for rotation and there is no likelihood of uneven pay-off due to lack of balance in the rotating parts.

The reel does not cause any pronounced wear on the line and the life of the line is thereby increased.

Oscillatory winding is achieved, tending to make the line remain straight in paying off and avoiding the likelihood of loops, kinks or snarls.

In the fishing pole of the invention the reel is a built-in part of the assembly, and not merely clamped on as in many older installations. The handle of the user grips the rod by a grip 20 similar to the grip of a knife, and extending longitudinally of the rod. The grip holds a bifurcated support consisting of a branch 21 for the reel and a branch 22 rigid therewith mounting a chuck 23 which may be of any well known type, which in turn removably grips a fishing rod 24 suitably of resilient metal and jointed or not as desired. The rod 24 may be of any well known type and carries suitable eyelets or guides 25 for a line 26 extending through the eyelets.

Suitably positioned on the side of the grip to which the finger will extend (the lower side) a trigger guard 27 is located on the support, and adjoining the guard there is an opening 28 through which a trigger 30 extends in a position to be engaged by the trigger finger of the user as best seen in Figure 2.

At either side of the support as may be desired (in some cases a left handed user will desire a left positioning) a windup crank 31 is provided for the reel, having a windup handle 32 and rotatably supported on a wind up shaft 33 as later explained. The windup shaft 33 turns in a bearing 34 (Figure 7) in the housing of the reel, and mounts thereon a gear 35 which suitably intermeshes with a transverse gear 36 on a bucket shaft 37. Since the bucket shaft 37 extends longitudinally of the grip and also of the pole and chuck, whereas the windup crank shaft is transverse thereto, the gears are suitably spiral gears which can intermesh and operate on axes at right angles to one another.

The gear 36 is suitably keyed or otherwise secured to the bucket shaft 37.

The bucket shaft is suitably tubular and is rotatably supported in a bearing 38 near its rear and on a rib 40 extending internally from the handle. At the forward end of the reel housing is mounted a plate 41 removably connected to the main structure of the grip and housing by screws 42. The plate carries a second bearing 43 for the bucket shaft.

At the forward end the bucket shaft is threaded at 44 and receives an internally threaded socket 45 of a generally cup shaped bucket 46. A washer of cork or other resilient material is interposed at 47 between the end of the bucket shaft and the socket. The bucket has a conical forward edge 48, which serves to clear the line, terminating in an apex 50 on the axis of the bucket shaft. The bucket also has toward the rear a cylindrical portion 51 adjoining the conical portion and terminating in a symmetrical smooth feeding edge 52 which adjoins and surrounds the outer edge of the spool as later explained. It is desirable that the edge 52 be free from imperfections which might serve to cut or fray the line, since the line travels over this edge as it pays out from the spool.

The bucket is desirably internally hollow as shown to provide space for the motion of the pickup.

A cup-like pickup 53 is also supported on the bucket shaft. The pickup has a cylindrical skirt or flange 54 provided with a pickup notch 55 having an axial retaining surface 56 in the direction behind the line in the normal direction of winding, and a gradual surface 57 curving out to the cylindrical edge in the direction forward of the line in normal direction of winding. The remainder of the circumference of the pickup skirt is suitably cylindrical as shown at 58.

Inwardly of the skirt 54 the pickup is suitably provided with a flat forward end 60 and at the interior it has a reverse flange 61 which surrounds the bucket shaft with sufficient freedom so that the pickup is slidable on the bucket shaft.

Adjoining the location of the pickup, the bucket shaft is slotted at 62 and through this slot the pickup is connected by a pin 63 extending through the reverse flange with a plunger 64 which extends through the hollow interior of the bucket shaft. Thus the pickup and plunger turn with the bucket and bucket shaft but the pickup moves longitudinally with the plunger between two extreme positions. In one position as seen in Figures 2, 3, 5, 6, and 9, the pickup surrounds the spool to be described, while in another position as shown in Figure 1, the pickup has telescoped within the bucket and takes no effective part in the operation.

The plunger 64 extends out the rear of the bucket shaft beyond the bearing 38, where it is provided with a ball end 65 as best seen in Figure 6 which rotatably sockets in the free end of a lever 66 having fixed pivot at 67 in the housing of the reel. The lever as shown is of arcuate formation and carries an actuating pin 68 at the side intermediate between its ends. The actuating pin is engaged by a suitably arcuate slot 70 in the outer end of a connecting rod 71 best seen in Figures 5 and 6 which pivotally connects to a crank 72 on the gear 35. The crank is positioned on the opposite end of the gear 35 from the connection of the gear with the windup shaft 33.

The trigger 30, pivoted on a fixed pivot 30' in the housing, has a trigger arm 73 which extends behind the lever 66 and engages that lever intermediate between its ends. The trigger also carries an abutment 74 on the side of the trigger arm which engages the side of the connecting rod remote from the plunger. An angular or torsional expansion spring 75 is connected between the connecting rod and the lever as best seen in Figure 6, tending to hold the connecting rod in the position with respect to the pin 68 which is remote from the end of the plunger 64.

Coaxial with the bucket and with the pickup is a spool 76 which in one form has a front flange 77, an internal hub 78 and an internally extending base flange 80 secured removably as by screws 81 on the plate 41.

The pickup is continuously urged toward the position telescoping around the spool by a spiral compression spring 82 which surrounds the bucket shaft and extends between the pickup and the interior of the bucket as best seen in Figure 6. The coil 83 of line 26 is mounted in the spool, the end of the coil being secured in any suitable manner as by tying around the hub of the spool or securing to an abutment if desired.

It will be evident that the spool is effectively stationary, whereas the bucket and pickup rotate.

In some cases it may be desirable to improve the replaceability of the spool, in order to permit the user to substitute one coil and spool for another with a minimum of delay. Thus the fisherman can carry several different weights of line and substitute them depending upon fishing conditions. One device performing this purpose is shown in Figures 9 to 11 inclusive. In this case the spool, instead of being mounted directly on the plate 41, is mounted on a spool base 84 as by screws 85. In this case the internal flange 80 is unnecessary and is omitted. The spool base 84 has a reverse flange 86 at the rear which has bayonet slots 87 which engage over the heads of screws 88 and lock by angularly shifting the base plate with respect to the bolts. The resilience of the metal of the base plate is sufficient to hold the spool in position on the bolts 88 until considerable torsional force is applied by the hand to remove it.

While the spool is to be regarded as stationary from the standpoint of the normal functioning of the reel, it may or may not be stationary at all times, and in some instances the spool may turn under retardation to provide a drag. In the form of Figures 1 to 11 this is unnecessary as the drag is provided in the windup shaft. Here the shaft 33 is pinned to the windup handle 31 by a pin 90 (Figure 7) and at its outer end is internally threaded at 91 to receive an adjustment screw 92. Inwardly the windup shaft is hollow at 93 (Figures 7 and 8) and contains a pressure rod 94 adjoining the adjustment screw and then an elastomer plug 95 of rubber, synthetic rubber or other elastomer. At the location of the plug the tubular shaft is slotted at 96 inside the gear 35 so that when sufficient pressure is applied on the adjustment screw 92 and pressure rod 93 the elastomer forced out through the slot 96 as shown in Figure 8 will tightly engage the gear and cause the gear to turn with the windup shaft. If the pressure is not sufficient, however, the shaft will slip with respect to the gear 35 and the pull on the line 26 at which this slippage will occur is adjusted by the adjustment screw 92. Thus the user is able at any time to determine how much frictional engagement he desires between the windup handle or crank and the pickup which is effecting the winding.

The eccentric is mounted on gear 35 (Figure 7) by an eccentric pivot 97 surrounding shaft 33 and connected to gear 35 by pin 98. Washer 100 is held on the end of shaft 33 by screw 101. The pivotal portion of eccentric pivot 97 forms eccentric 72. Eccentric strap 71 is interposed between the flange of eccentric.

Instead of or in addition to the drag as shown in Figures 7 and 8, a drag may be used as shown in Figures 12 and 13.

In this form the spool 76 is mounted by pins 102 on a drag collar 103 which freely surrounds rotatable bucket shaft 37. The drag collar 103 journals at 104 in plate 41'. A flange 105 threaded on drag collar 103 is engaged on the circumference by drag lever 106 pivoted on fixed pivot 107 on plate 41'. Pressure on drag lever 106 is adjusted by screw 108 in the housing bearing on spring 110 which engages spring socket 111 which bears on the drag lever. Thus adjusting the screw 108 changes the resistance to turning of the spool when a fish pulls the line, or during casting.

In operation, considering first the procedure followed by the user, the pole will normally be held upright with a short length of line extending beyond the end at the beginning of a cast. The trigger finger of the user is adjacent the trigger and in position to release it. The fisherman begins the forward stroke of the cast and at or near the beginning of the stroke pulls on the trigger. This releases the line from the reel and the line pays out under the inertia of the rig including the hooks, sinker and lure or bait. The fisherman then releases his grip on the trigger and allows the pickup to engage the line in the pick up notch. This occurs automatically. He then winds the windup handle, winding up the line until the desired amount of line has been brought in.

Considering now the mechanical steps of the operation, when the trigger is pulled as shown in Figure 1 the trigger arm presses the lever 66, the lever pivots about its fixed pivot 67, the free end of the lever forces the plunger 64 forward and the pin 63 forces the pickup forward against the action of the spring 82 until the pickup effectively disappears by telescoping inside the bucket as shown in Figure 1. In this position the pickup notch releases the line and the line engaging the payoff edge 52 of the bucket pays out by travelling around that edge as it unrolls from the spool. Thus in Figure 4 the line travels right around the circumference of the bucket as it pays out.

At the end of the cast when it is desired to wind in the line, the trigger is released to the position of Figures 2, 3, 5, 6, and 9, allowing the pickup to move back around the spool. The pickup notch then is in position to take hold of the line, as shown in Figures 2, 3 and 11. The user then grips the windup crank and turns it in the direction for winding up the line, causing the windup shaft to turn and unless the drag is excessively loose in the form of Figures 1 to 11, turning the gear 35 and turning the bucket shaft. As the bucket shaft turns it causes the bucket and the pickup to turn as well as the plunger, which is rotatable due to the socketing of the ball 65 in the lever 66. At the same time that the gearing turns, the crank causes the lever 66 to oscillate, moving the plunger in and out and causing the pickup to oscillate from one side to the other side of the spool as it winds. This is indicated by Figures 3, 5, 6 and 9 which show different oscillating positions of the pickup. The serpentine path of the line on the coil prevents the line from tangling and gives to the line a tendency to remain straight after it has payed off the coil, avoiding the tendency otherwise caused to kink during the recovery of the cast.

As the plunger oscillates, the connecting rod slot 70 remains as far as possible in a position seen in Figure 6 with respect to the pin 68 due to the action of spring 75. When the trigger is actuated however there is freedom for movement of the connecting rod with respect to the pin 68 under the action of abutment 74 which prevents jamming of the parts.

In order to vary the drag on the device in the form of Figures 1 to 11 the user simply tightens or loosens on the screw 92. Using the form of Figures 12 and 13 he simply tightens or loosens on the screw 108.

The two drags operate somewhat differently. In the form of Figures 1 to 11 the drag permits the windup handle to be operated without winding in the line when the drag adjustment is sufficiently loose to permit shaft 33 to turn without sufficient frictional engagement by the rubber 95 to turn gear 35. In case, however, of unusual heavy pull by the fish the line is not free to pay out in this form, it being necessary to operate the trigger in order to permit the line to pay out.

With the drag of the character of Figures 12 and 13 an excessive pull by the fish will permit the spool to turn and pay out the line notwithstanding that the pickup notch still engages the line. It will be obvious, of course, that for specialized types of fishing both forms of drags may be used in the same reel, and in this case the showings of Figures 7, 12 and 13 will apply to the same reel.

In case it is desired to change the line, this can readily be done. The fisherman simply holds the windup handle and twists the bucket in the direction to unscrew the bucket from the bucket shaft. This direction will usually be opposite from the direction of rotation. Then the trigger is pulled, moving the pickup out. Since the retardation of the spring 82 is no longer present after removing the bucket the pickup can be moved far enough out to permit extraction of the pin 63, after which the pickup can be pulled off from the end of the bucket shaft. The spool can then be removed by taking out the screws 81 in the form of Figure 6 or by shifting the position on the bayonet joint in the form of Figures 9 to 11. In the form of Figures 12 and 13 the drag collar is removed with the spool by unscrewing flange 105 from drag collar 103. A new spool can then be replaced for the one removed and the device reassembled.

It will be evident that the user can very conveniently operate the device and that the bulk and weight heretofore considered necessary in a fishing reel is unnecessary in a reel of the type of the present invention.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A fishing reel for pay-off longitudinally of the reel axis, comprising a spool, a grip supporting the spool, a bucket positioned coaxially of the spool on the side toward which pay-off takes place, mechanism to rotate the bucket, an annular pickup mounted concentric of and movable with the bucket and telescoping with respect to the bucket, the pickup in one position annularly surrounding the spool and in another position uncovering the spool, and trigger mechanism adapted to be engaged by the finger when the hand is on the grip to move the pickup from a position surrounding the spool to a position uncovering the spool.

2. In a fishing reel of the type which pays off axially, a relatively stationary spool, a grip supporting the spool, a bucket co-axial with the spool positioned on the side toward payoff and having a smooth edge outside the edge of the spool toward payoff, means for mounting the bucket, a handle for turning the bucket, mechanical interconnections between the handle and the bucket for turning the bucket with respect to the spool, an annular pickup telescoping within the bucket, in one position circumferentially surrounding the spool, and turning with the bucket, a trigger adapted to be engaged by the finger when the hand is on the grip and lever mechanism interconnected between the trigger and the pickup for moving the pickup to a position uncovering the spool in response to action of the trigger.

3. In a fishing reel of the type which pays off axially, a relatively stationary spool, a bucket on the side of the spool toward payoff and having a smooth edge surrounding the edge of the spool toward payoff, a tubular shaft extending through the spool and mounting the bucket coaxial with the spool, a handle, gearing interconnecting the tubular shaft and the handle to drive the same, a pickup mounted on the tubular shaft and turning with the same and having a position surrounding the spool and a position telescoping with respect to the bucket and uncovering the spool, there being a slot through the tubular shaft, a plunger extending through the tubular shaft and interconnected with the pickup through the slot and trigger means for moving the plunger longitudinally to shift position of the pickup with respect to the spool.

4. In a fishing reel of the type which pays off axially, a relatively stationary spool, a bucket on the side of the spool toward pay-off and having a smooth edge surrounding the edge of the spool toward pay-off, a tubular shaft extending through the spool and mounting the bucket coaxial with the spool, a handle, gearing interconnecting the tubular shaft and the handle to drive the same, a pickup mounted on the tubular shaft and turning with the same and having a position surrounding the spool and a position telescoping with respect to the bucket and uncovering the spool, there being a slot through the tubular shaft, a plunger extending through the tubular shaft and interconnected with the pickup through the slot, a trigger and a lever interconnecting the trigger and the plunger to shift the plunger axially and thereby shift the pickup when the trigger is depressed.

5. In a fishing reel of the type which pays off axially, a relatively stationary spool, a bucket on the side of the spool toward pay-off and having a smooth edge surrounding the edge of the spool toward pay-off, a tubular shaft extending through the spool and mounting the bucket coaxial with the spool, a handle, gearing interconnecting the tubular shaft and the handle to drive the same, a pickup mounted on the tubular shaft and turning with the same and having a position surrounding the spool and a position telescoping with respect to the bucket and uncovering the spool, there being a slot through the tubular shaft, a plunger extending through the tubular shaft and interconnected with the pickup through the slot, a spring surrounding the tubular shaft between the bucket and the pickup and urging the pickup away from the bucket, a trigger and lever mechanism interconnecting the trigger with the plunger and on pressure against the trigger shifting the plunger and pickup axially against the action of the spring.

6. In a fishing reel, a relatively stationary spool, a bucket coaxial with the spool located on the side of the spool toward payoff and having a pay-off edge surrounding the edge of the spool toward pay-off, a tubular shaft extending through the spool and rotatably supporting the bucket and having an axially extending slot inside the bucket, a winding handle, gearing connecting the winding handle with the tubular shaft to turn the bucket, a plunger extending through the tubular shaft to the location of the slot, a pickup supported on the tubular shaft, surrounding the spool in one position and in another position uncovering the spool and telescoping through the plunger bucket, a pin extending through the plunger passing through the slot and engaging the pickup, a lever pivotally mounted at one end and socketing the end of the plunger remote from the bucket at the other end of the lever, a trigger pivoted at one end and having an extension which engages the side of the lever remote from the plunger and spring means urging the pickup, pin, plunger, lever and trigger toward the position in which the pickup surrounds the spool.

7. In a fishing reel for payoff longitudinally of the reel axis, a spool, a bucket coaxial with the spool on the side toward which payoff takes place, a hollow shaft extending through the spool and rotatably supporting the bucket, a pickup mounted on the shaft, axially movable with respect to the shaft and having a position surrounding the spool and a position telescoping with respect to the bucket and uncovering the spool, a handle for operating the reel, gearing interconnecting the handle with the hollow shaft, a plunger extending through the hollow shaft and interconnected with the pickup through a slot in the shaft, a crank operated by the handle, an oscillating linkage interconnecting the crank and the plunger and a trigger operating on the plunger to move the pickup to the position uncovering the spool when the trigger is actuated.

8. In a fishing reel, a grip, a hollow shaft extending generally longitudinally of the grip and rotatably mounted thereon, a crank arm rotatably secured to the grip, gearing interconnecting the crank arm and the hollow shaft, a plunger extending through the hollow shaft, an oscillating linkage between the plunger and the crank arm, a trigger interconnected with the plunger to move it longitudinally in the hollow shaft, a relatively stationary spool surrounding the plunger and hollow shaft, a slot in the hollow shaft adjacent the spool, a bucket on the end of the hollow shaft remote from the grip, the bucket having a uniform annular payoff edge around the spool at the edge remote from the grip, and an annular pickup longitudinally movably supported on the hollow shaft and in one position surrounding the spool and in another position telescoping with respect to the bucket and uncovering the spool, a pin extending through the slot and connecting the pickup with the plunger and spring means urging the pickup toward the position in which it surrounds the spool.

9. In a fishing rod, a grip, a hollow shaft extending longitudinally of the grip and rotatably mounted thereon, a crank arm pivotally mounted on the grip, gearing interconnecting the crank arm and the hollow shaft, a crank mounted on the gearing, a lever pivoted at one end adjacent the path of movement of the crank, a plunger extending through the hollow shaft and rotatably socketing in the other end of the lever, a pin on the lever intermediate its ends, a connecting rod having one end pivotally mounted on the crank and having a slot at the other end engaging the pin, a trigger engageable by the finger when gripping the grip, pivotally mounted at one end on the grip and having a trigger arm extending behind and engaging the lever at the side remote from the crank, a relatively stationary spool surrounding the hollow shaft, a bucket secured to the end of the hollow shaft remote from the grip and having an annular payoff edge around the edge of the spool remote from the grip, a pickup longitudinally movably mounted on the hollow shaft and in one position annularly surrounding the spool and in another position uncovering the spool and telescoping with respect to the bucket, there being a slot in the hollow shaft adjacent the pickup, a pin extending through the pickup and connecting it with the plunger and spring means urging the pickup toward the position surrounding the spool.

10. In a fishing rod, a grip, a hollow shaft extending longitudinally of the grip and rotatably mounted thereon, a crank arm pivotally mounted on the grip, gearing interconnecting the crank arm and the hollow shaft, a crank mounted on the gearing, a lever pivoted at one end adjacent the path of movement of the crank, a plunger extending through the hollow shaft and rotatably socketing in the other end of the lever, a pin on the lever intermediate its ends, a connecting rod having one end pivotally mounted on the crank and having a slot at the other end engaging the pin, a trigger engageable by the finger when gripping the grip, pivotally mounted at one end on the grip and having a trigger arm extending behind and engaging the lever at the side remote from the crank, a torsional spring engaging the connecting rod at the end remote from the crank and engaging the lever adjacent the attachment to the plunger and urging the connecting rod to the position with respect to the first pin in which the pin engages the slot at the side toward the attachment to the plunger, an abutment on the trigger arm engaging the connecting rod on the side remote from the plunger, a relatively stationary spool surrounding the hollow shaft, a bucket secured to the end of the hollow shaft remote from the grip and having an annular payoff edge around the edge of the spool remote from the grip, a pickup longitudinally movably mounted on the hollow shaft and in one position annularly surrounding the spool and in another position uncovering the spool and telescoping with respect to the bucket, there being a slot in the hollow shaft adjacent the pickup, a pin extending through the pickup and connecting it with the plunger and spring means urging the pickup toward the position surrounding the spool.

JOHN B. HAND.

REFERENCES CITED

The following references are of record in the file of this patent:

UNITED STATES PATENTS

| Number | Name | Date |
| --- | --- | --- |
| 70,888 | Palmiter | Nov. 12, 1867 |
| 187,929 | St. John | Feb. 27, 1877 |
| 1,187,840 | Illingworth | June 20, 1916 |
| 2,179,413 | Kolosso | Nov. 7, 1939 |
| 2,500,445 | Worden | Mar. 14, 1950 |

FOREIGN PATENTS

| Number | Country | Date |
| --- | --- | --- |
| 22,597 of 1907 | Great Britain | June 11, 1908 |
| 402,080 | Great Britain | Nov. 20, 1933 |
| 618,929 | Great Britain | Mar. 1, 1949 |
| 882,204 | France | Feb. 22, 1943 |